3,511,752
METHOD FOR PRODUCING L-GLUTAMIC ACID
Katsunobu Tanaka and Kazuo Kimura, Machida-shi, Japan, assignors to Kyowa Hakko Kogyo Co., Ltd., Tokyo, Japan, a corporation of Japan
No Drawing. Continuation of application Ser. No. 656,011, July 26, 1967. This application July 17, 1968, Ser. No. 745,355
Int. Cl. C12d *13/06*
U.S. Cl. 195—28                                              16 Claims

ABSTRACT OF THE DISCLOSURE

L-glutamic acid is produced by fermentation of a nutrient medium containing hydrocarbon as principal or sole assimilable carbon source together with a nitrogen source and inorganic salts, and is enhanced by the inclusion of acetic acid, or of an antibiotic, or of a surface active agent, or of a higher fatty acid, as an additional component, Microorganisms which have been found suitable for the fermentation are of the genera Coryne-bacterium, Arthrobacter, Brevibacterium and Micrococcus.

CROSS-REFERENCE TO RELATED APPLICATION

This application is a continuation application of copending application Ser. No. 656,011, filed on July 26, 1967, which is a continuation-in-part application of Ser. No. 433,478 filed on Feb. 17, 1965 both now abandoned.

BACKGROUND OF THE INVENTION

It is well known to produce L-glutamic acid by fermentation, on an industrial scale, by culturing certain microorganisms on nutrient media containing carbohydrates as the carbon source. The carbohydrate substrates employed, however, present the disadvantage of being relatively expensive raw materials.

It is also known to produce L-glutamic acid by fermentation using microorganisms capable of converting a hydrocarbon, or a mixture of hydrocarbons, as a principal carbon source, when cultured on a nutrient medium containing such hydrocarbons. Although this has the advantage of employing cheaper raw materials, the quantity of L-glutamic acid produced is generally of the order of only several hundred gammas per ml. of the nutrient medium. In other words, the amount of amino acid produced is so minuscule, in reported cases of such prduction, that the amino acid thus produced has to be regarded as nothing more than a product of autolysis of the microorganism. In any event, such conversion with production of essentially no more than traces of amino acid can hardly be regarded as of significance in so far as the commercial production of glutamic acid is concerned.

SUMMARY

A primary object of the present invention is the development of commercially feasible processes for the microbiological or fermentative production of L-glutamic acid from a readily accessible and very cheap source of carbon, namely hydrocarbon or a mixture of hydrocarbons.

The present invention is based on the observation that microorganisms of the genera Corynebacterium, Arthrobacter, Brevibacterium, and Micrococcus, are not only capable of fermentatively producing remarkable large amounts of L-glutamic acid in an aqueous nutrient medium containing hydrocarbon or hydrocarbon mixture as principal or sole assimilable carbon source and are therefore especially adapted for use in commercial scale operations, but that their hydrocarbon-conversion capacity is further considerably increased by the concomitant presence in the nutrient medium (fermentation liquor) of a conversion-enhancing additive, which may be acetic acid (as such or in the form of its alkali metal salt, e.g. sodium salt or potassium salt, or ammonium salt), or an antibiotic, or a surface-active agent, or a higher fatty acid. This enhancement of the conversion of hydrocarbon(s) into L-glutamic acid correspondingly increases the significance of the process as commercially feasible and industrially practicable. A further characteristic advantage of the invention is that L-glutamic acid is essentially the sole conversion product in the liquid culturing medium.

The conversion-enhancing agent may itself function as assimilable carbon source for the conversion under consideration. However, the conversion realized by the concomitant employment of hydrocarbon(s) and, for example, acetic acid or salt thereof, is considerably in excess of the sum of the conversions into L-glutamic acid realizable from the said two carbon source individually.

The conversion-enhancing additive, which is preferably used in small amount in comparison to the hydrocarbon(s) constituting the principal and low-cost carbon source, not only increases the efficiency of the hydrocarbon(s) employed, but results in suppression of formation, as by-products, of undesired amino acids—i.e. amino acids other than L-glutamic acid—such by-product formation of by-product amino acids being an undesirable incident when saccharidic materials are employed as assimilable carbon source.

As for the hydrocarbons used as assimilable carbon source in the process of the present invention, aliphatic hydrocarbons with 10 to 20 carbon atoms in the molecule can be used. However, best yields of L-glutamic acid are obtained with normal paraffins with 10 to 18 carbon atoms. Thus, useful hydrocarbons for the purposes of the present invention comprise decane, undecane, dodecane, tridecane, tetradecane, pentadecane, hexadecane, heptadecane, octadecane, nonadecane and eicosane, as the normal compounds or in the iso-forms, individually or in admixtures such as are frequently obtained in practice. However, the normal paraffins: n-decane, n-undecane, n-dodecane, n-tridecane, n-tetradecane, n-pentadecane, n-hexadecane, n-heptadecane and n-octadecane, severally or in admixture, e.g. in the form of commercial mixtures, give superior results.

DESCRIPTION OF SPECIFIC ILLUSTRATIVE FEATURES AND PROCEDURES

The following table exemplifies the production of L-glutamic acid according to this invention and illustrates in particular the synergistic effect of the presence of acetic acid or salt thereof in enhancing the conversion of the hydrocarbon used as principal carbon source:

TABLE 1*

| Name of strain | Culturing medium A; production amount of L-glutamic acid (yield) mg./ml. | Culturing medium B; production amount of L-glutamic acid (yield) mg./ml. | Culturing medium C; production amount of L-glutamic acid (yield) mg./ml. |
|---|---|---|---|
| *Arthrobacter simplex*, No. 3151 (ATCC No. 15799) | 4.6 (9.2%) | 3.8 (3.8%) | 18.8 (31%) |
| *Corynebacterium hydrocarboclastus*, No. 2438 (ATCC No. 15592) | 4.2 (8.4%) | 4.5 (4.5%) | 17.9 (30%) |

* All percentages are by weight.

NOTE:
Carbon source of culturing medium A: 5% of undecane.
Carbon source of culturing medium B: 1% of sodium acetate (as acetic acid).
Carbon source of culturing medium C: 5% of undecane and 1% of sodium acetate (as acetic acid).

Further constitution of nutrient medium:

| | Percent by wt. |
|---|---|
| $KH_2PO_4$ | 0.1 |
| $Na_2HPO_4 \cdot 12H_2O$ | 0.1 |
| $MgSO_4 \cdot 7H_2O$ | 0.1 |
| $FeSO_4 \cdot 7H_2O$ | 0.02 |
| $MnSO_4 \cdot 4H_2O$ | 0.002 |
| Meat extract | 0.1 |
| $(NH_4)_2SO_4$ | 2.0 |
| Phenol red | 0.001 |
| $CaCO_3$ | 2.0 |
| Remainder water; pH 7.0. | |

Culturing conditions.—To three separate nutrient or fermentation mediums constituted as indicated, one of the carbon sources A, B and C was added, the medium then inoculated with *Arthrobacter simplex* No. 3151 and subjected to shaking culture at 30° C. for 72 hours with 120 reciprocations per minute.

pH of the medium was controlled by the addition of $(NH_4)_2CO_3$ and the value of 6.0 to 8.0 was maintained. The procedure was thereafter repeated with *Corynebacterium hydrocarboclastus* No. 2438.

It is clear from Table 1 that the production yield of L-glutamic acid from hydrocarbon is exceedingly increased in every case by the addition of, effectively, acetic acid.

In practicing the process of this invention, the fermentation medium may contain, in addition to the hydrocarbon and conversion-enhancing additive as carbon sources, conventional nitrogen sources e.g. ammonium salt such as ammonium sulfate, ammonium chloride or the like or urea, also conventionally-employed inorganic salts and some usual organic nutrient. As organic nutrient, peptone, corn steep liquor, meat extract, yeast extract, hydrolysis product of soy bean meal or the like is useful. The addition of meat extract is particularly effective in the production of L-glutamic acid. Instead of these organic nutrients, it is possible to produce L-glutamic acid with high production yield by the addition of various vitamins, amino acids, organic nucleic acid base or the like. During the course of fermentation, aerobic culturing condition is required and it is important to maintain pH at 5.0 to 9.0, particularly at 6.0 to 8.0, by the addition of e.g. ammonium salt, ammonia or urea during the culturing period.

In order that those skilled in the art may more fully understand the nature of the invention and the method of carrying it out, the following illustrative examples of presently preferred embodiments are given. In these examples, the relationship between parts by weight and parts by volume is the same as that between grams and milliliters.

Example 1

Two hundred parts by volume of a fermentation medium containing

| | Percent by wt. |
|---|---|
| $KH_2PO_4$ | 0.1 |
| $Na_2HPO_4 \cdot 12H_2O$ | 0.1 |
| $MgSO_4 \cdot 7H_2O$ | 0.1 |
| $FeSO_4 \cdot 7H_2O$ | 0.02 |
| $MnSO_4 \cdot 4H_2O$ | 0.002 |
| Meat extract | 0.1 |
| $(NH_4)_2SO_4$ | 2.0 |
| n-Undecane | 5.0 |
| Sodium acetate | 1.0 |
| Phenol red | 0.001 |
| Remainder water; pH 7.0. | | are introduced into a receptacle having a capacity of 2000 parts by volume. In this medium, the strain of hydrocarbon-converting microorganism, *Arthrobacter simplex* No. 3151 (ATCC No. 15799) is inoculated and subjected to shaking culture under aerobic conditions at 30° C. for 72 hours at 220 reciprocations per minute. The accumulation of L-glutamic acid reaches 20.0 milligrams per milliliter.

During the cultivation, the pH is controlled and maintained at 6.0 to 8.0 by the addition of $(NH_4)_2CO_3$ when necessary.

Upon completion of the cultivation, the L-glutamic acid is removed from the fermentation broth by passing the latter through cation exchange resin, in per se known manner, whereupon the L-glutamic acid is adsorbed. The L-glutamic acid is then eluted with dilute aqueous ammonia, the obtained solution concentrated and then cooled. Crystals of L-glutamic acid separate, are isolated and recrystallized. The recovery or harvesting of the L-glutamic acid from the fermentation liquor is per se no part of the present invention, and may be carried out in any manner known in prior fermentative processes for the production of L-glutamic acid. (Any other known procedure for recovering L-glutamic acid from a fermentation medium in which it was produced, can also be employed.)

About 3.2 parts of recrystallized L-glutamic acid are obtained.

Example 2

Ten thousand parts by volume of culture medium of the following composition were prepared:

| | Percent by wt. |
|---|---|
| $KH_2PO_4$ | 0.1 |
| $Na_2HPO_4 \cdot 12H_2O$ | 0.1 |
| $MgSO_4 \cdot 7H_2O$ | 0.1 |
| $FeSO_4 \cdot 7H_2O$ | 0.02 |
| $MnSO_4 \cdot 4H_2O$ | 0.002 |
| Meat extract | 0.1 |
| $(NH_4)_2SO_4$ | 1.0 |
| Ammonium acetate (as acetic acid) | 1.0 |
| Phenol red | 0.001 |
| Remainder water; pH 7.0. | | and sterilized by heat in a fermenter of 20,000 parts by volume capacity.

*Corynebacterium hydrocarboclastus* No. 2438 (ATCC No. 15592) is precultured by aerobic shaking culture in a liquid bouillon medium containing 1% by weight of kerosene (petroleum distillation fraction consisting essentially of a mixture of n-$C_{12}$ to n-$C_{16}$ paraffin hydrocarbons; B.P. about 200°–300° C.) for 24 hours.

The thus-obtained preculture is introduced into the sterilized culture medium in the aforesaid fermenter, in a proportion of about 5% by volume, and culturing is carried out at 30° C. for 72 hours with stirring at about 300 revolutions per minute while passing in one liter of bacteria-free air per liter of medium per minute.

Starting at the twelfth hour of such culturing in the said fermenter, kerosene is added to the medium at the rate of about 1.2 percent by weight in the course of every 12 hours in such manner that a total of 5% by weight will have been added by the end of the culture period. During the culturing period $(NH_4)_2CO_3$ is added, simultaneously with the addition of the kerosene, to assure maintenance of the pH of the fermentation liquor at 6.8.

The production of L-glutamic acid at the end of the fermentation amounts to 15.1 milligrams per milliliter.

Example 3

The procedure according to Example 1 was repeated, except that the 0.1% of meat extract was replaced by 0.3% of corn steep liquor, the 1% of sodium acetate (as acetic acid) was replaced by 1% of ammonium acetate (as acetic acid), and *Corynebacterium hydrocarboclastus* No. 2438 (ATCC No. 15592) was used as the converting microorganism in lieu of *Arthrobacter simplex* No. 3151; in addition 50 units of Penicillin G per milliliter were added at the 6th hour of culture. In other respects, the same culturing procedure was followed as in Example 1. From 200 parts by volume of culturing liquor, about 2.2 parts by weight of L-glutamic acid were obtained.

Example 4

Ten thousand parts by volume of culture medium of the following composition were prepared:

| | Percent by wt. |
|---|---|
| $KH_2PO_4$ | 0.1 |
| $K_2HPO_4$ | 0.1 |
| $MgSO_4 \cdot 7H_2O$ | 0.05 |
| $FeSO_4 \cdot 7H_2O$ | 0.02 |
| $MnSO_4 \cdot 4H_2O$ | 0.002 |
| Meat extract | 0.1 |
| $(NH_4)_2SO_4$ | 1.0 |

Remainder water; pH about 7.0.

and sterilized by heat in a fermenter of 20,000 parts by volume capacity.

*Corynebacterium hydrocarboclastus* No. 2438 (ATCC No. 15592) is precultured by aerobic shaking culture in a liquid bouillon medium containing 1% by weight of kerosene, for 24 hours.

The thus-obtained preculture is introduced into the sterilized culture medium in the aforesaid fermenter, in a proportion of about 5% by weight, and cultivation is carried out for 96 hours with stirring at about 30° C. at about 300 revolutions per minute while passing into the fermentation liquor one liter of sterilized air per liter of medium per minute.

At the start of the cultivation period, 500 parts by volume of a mixture consisting of $C_{11}$, $C_{12}$, $C_{13}$, $C_{14}$, $C_{15}$, $C_{16}$, $C_{17}$ and $C_{18}$ n-paraffins is added, and the pH is maintained at 6.8 to 8.0 by introducing ammonia gas during the said period, and Penicillin G was added 12 hours after the beginning of fermentation to maintain 50 units/ml. concentration thereof in the medium.

The production of L-glutamic acid at the end of the fermentation amounted to 10.5 milligrams per milliliter.

Example 5

Amounts of L-glutamic acid obtained by addition of various antibiotics in fermentation using microorganisms capable of fermentatively converting hydrocarbons to L-glutamic acid are shown in Table 2.

The fermentation medium utilized was as follows:

| | Percent by wt. |
|---|---|
| $KH_2PO_4$ | 0.1 |
| $Na_2HPO_4 \cdot 12H_2O$ | 0.1 |
| $MgSO_4 \cdot 7H_2O$ | 0.05 |
| $FeSO_4 \cdot 7H_2O$ | 0.01 |
| $MnSO_4 \cdot 4H_2O$ | 0.002 |
| Corn steep liquor | 0.3 |
| $NH_4NO_3$ | 2.0 |
| n-Paraffin mixture (Equivalent mixture of $C_{11}$–$C_{14}$) | 10.0 |
| Phenol red | 0.001 |

Remainder water; pH 7.0.

Twenty (20) ml. of the above-specified fermentation medium were placed in 250 ml. conical flasks.

The various strains of hydrocarbon-converting microorganisms are pre-cultured in the medium containing 0.25% yeast extract, 0.5% bouillon, 0.5% peptone, 0.25% NaCl, for 24 hours.

The above precultured strains were inoculated into the aforesaid fermentation medium and subjected to shaking-culture at 30° C. for 12 hours. During the cultivation, the pH is controlled and maintained at 6.5 to 7.0 by the addition of $(NH_4)_2CO_3$ and urea when necessary. Dosage and time of addition of the antibiotics are shown in Table 2.

TABLE 2

| Name of micro-organisms used | Antibiotics added | Dosage | Time of addition of antibiotics after beginning of fermentation (hrs.) | Amounts of L-glutamic acid formed (mg./ml.) |
|---|---|---|---|---|
| *Arthrobacter paraffineus:* | | | | |
| ATCC Number 15591 | Penicillin G | 50μ/ml. | 24 | 12.8 |
| Do | Kephrine | 100 γ/ml. | 24 | 15.2 |
| Do | Bacitracin | 100 γ/ml. | 24 | 10.2 |
| Do | Novobiocin | 100 γ/ml. | 24 | 9.6 |
| Do | Spiramycin | 50 γ/ml. | 24 | 11.0 |
| Do | Kanamycin | 50 γ/ml. | 30 | 10.1 |
| Do | Streptomycin | 100 γ/ml. | 24 | 8.2 |
| Do | Streptomycin complex | 50 γ/ml. | 24 | 9.5 |
| Do | Cycloserine | 100 γ/ml. | 24 | 10.2 |
| Do | do | 100 γ/ml. | 24 | 13.0 |
| Do | (Control) | | | 2.5 |
| *Brevibacterium ketoglutamicum:* | | | | |
| ATCC Number 15588 | Penicillin G | 50 μ/ml. | 24 | 10.9 |
| Do | Kephrine | 100 γ/ml. | 24 | 11.2 |
| Do | Bacitracin | 100 γ/ml. | 24 | 8.5 |
| Do | (Control) | | | 1.1 |

TABLE 2.—Continued

| Name of micro-organisms used | Antibiotics added | Dosage | Time of addition of antibiotics after beginning of fermentation (hrs.) | Amounts of L-glutamic acid formed (mg./ml.) |
|---|---|---|---|---|
| *Arthrobacter hydrocarboglutamicus:* | | | | |
| ATCC Number 15583 | Penicillin G | 50 μ/ml. | 24 | 12.4 |
| Do | Kephrine | 100 γ/ml. | 24 | 11.5 |
| Do | Spiramycin | 50 γ/ml. | 24 | 10.8 |
| Do | (Control) | | | 1.5 |
| *Arthrobacter roseoparaffineus:* | | | | |
| ATCC Number 15584 | Penicillin G | 50 μ/ml. | 24 | 8.9 |
| Do | (Control) | | | 2.3 |
| *Brevibacterium keto-glutamicum:* | | | | |
| ATCC Number 15587 | Penicillin G | 50 μ/ml. | 24 | 12.7 |
| Do | (Control) | | | 2.5 |
| *Arthrobacter paraffineus:* | | | | |
| ATCC Number 15590 | Penicillin G | 50 μ/ml. | 24 | 14.5 |
| Do | (Control) | | 24 | 1.7 |
| *Corynebacterium hydrocarboclastus:* | | | | |
| ATCC Number 15592 | Penicillin G | 50 μ/ml. | 24 | 11.2 |
| Do | (Control) | | | 2.1 |
| *Micrococcus paraffinolyticus:* | | | | |
| ATCC Number 15582 | Penicillin G | 50 μ/ml. | 24 | 8.0 |
| Do | (Control) | | | 0.5 |
| *Micrococcus paraffinolyticus:* | | | | |
| ATCC Number 15589 | Penicillin G | 50 μ/ml. | 24 | 5.9 |
| Do | (Control) | | | 0.2 |

Example 6

By the addition of various surface active agents or higher fatty acids, at the beginning of cultivation, amounts of glutamic acid formed in the culture medium by microorganisms capable of fermentatively converting hydrocarbon, are shown in Table 3. The same culturing procedure was followed as in Example 5, with the exception that the content of corn steep liquor in the medium was 0.05%, and no antibiotic was added.

Example 7

By the addition of various surface active agents or higher fatty acids 24 hours after the beginning of fermentation, amounts of glutamic acid formed in the culture medium by microorganisms capable of fermentatively converting hydrocarbon are shown in Table 4. The same culturing procedure was followed as in Example 5, with the exception that the content of corn steep liquor in the medium was 0.1%, and no antibiotic was added.

TABLE 3

| Microorganisms used | Additional components added | Dosage | Time of addition | Amounts of L-glutamic acid formed (mg./ml.) |
|---|---|---|---|---|
| *Arthrobacter paraffineus:* | | | | |
| ATCC Number 15591 | Nonion OT-221 (also known as Tween 80, which is polyoxyethylene sorbitan monooleate). | 100γ/ml. | At the beginning of cultivation | 18.2 |
| Do | Nonion LP-20R (also known as Span 20 which is sorbitan mono-laurate). | 100γ/ml. | do | 17.5 |
| Do | Nonion ST-221 (also known as Tween 60, which is polyoxyethylene sorbitan monostearate). | 100γ/ml. | do | 19.6 |
| Do | Anon BF (alkyl betaine-ampholytic surfactant). | 100γ/ml. | do | 18.0 |
| Do | do | 100γ/ml. | do | 18.2 |
| Do | (Control) | | | 15.3 |
| *Brevibacterium ketoglutamicum:* | | | | |
| ATCC Number 15588 | Nonion OT-221 | 100γ/ml. | At the beginning of cultivation | 17.8 |
| Do | (Control) | | | 14.2 |
| *Arthrobacter paraffineus:* | | | | |
| ATCC Number 15590 | Nonion ST-221 | 100γ/ml. | At the beginning of cultivation | 19.5 |
| Do | Caprylic acid | 1 mg./ml. | do | 17.8 |
| Do | Lauric acid | 1 mg./ml. | do | 18.1 |
| Do | Myristic acid | 1 mg./ml. | do | 19.0 |
| Do | (Control) | | | 13.1 |
| *Brevibacterium keto-glutamicum:* | | | | |
| ATCC Number 15587 | Stearic acid | 1 mg./ml. | At the beginning of cultivation | 18.6 |
| Do | Oleic acid | 1 mg./ml. | do | 18.5 |
| Do | (Control) | | | 11.5 |
| *Arthrobacter hydrocarbo-glutamicus:* | | | | |
| ATCC Number 15583 | Nonion LP-20R | 100γ/ml. | At the beginning of cultivation | 19.2 |
| Do | (Control) | | | 10.8 |
| *Arthrobacter roseoparaffineus:* | | | | |
| ATCC Number 15584 | Nonion LP-20R | 100γ/ml. | At the beginning of cultivation | 18.5 |
| Do | (Control) | | | 11.2 |
| *Corynebacterium hydrocarbo-clastus:* | | | | |
| ATCC Number 15592 | Nonion OT-221 | 100γ/ml. | At the beginning of cultivation | 18.6 |
| Do | (Control) | | | 10.9 |
| *Micrococcus paraffinolyticus:* | | | | |
| ATCC Number 15582 | Nonion OT-221 | 100γ/ml. | At the beginning of cultivation | 8.8 |
| Do | (Control) | | | 3.1 |
| Do | Nonion OT-221 | 100γ/ml. | At the beginning of cultivation | 9.5 |
| Do | (Control) | | | 4.0 |

TABLE 4

| Microorganisms used | Additional components added | Dosage | Time of addition after beginning of fermentation (hrs.) | Yield of L-glutamic acid (mg./ml.) |
|---|---|---|---|---|
| *Arthrobacter paraffineus:* | | | | |
| ATCC Number 15591 | Nymeen S215 (polyoxyethylene alkylamine, a cationic surfactant). | 0.5 mg./ml. | 24 | 18.2 |
| Do | Softer #601 (alkyl betaine, an anionic sufactant) | 0.5 mg./ml. | 24 | 18.0 |
| Do | Linoleic acid | 0.5 mg./ml. | 24 | 18.9 |
| Do | Abietic acid | 0.5 mg./ml. | 24 | 19.0 |
| Do | (Control) | | | 2.0 |
| *Brevibacterium ketoglutamicum:* | | | | |
| ATTC Number 15587 | Catiogen H | 0.5 mg./ml. | 24 | 17.5 |
| Do | Linoleic acid | 0.5 mg./ml. | 24 | 16.8 |
| Do | Abietic acid | 0.5 mg./ml. | 24 | 17.7 |
| Do | (Control) | | | 1.8 |
| *Corynebacterium hydrocarboclastus:* | | | | |
| ATCC No. 15592 | Catiogen H | 0.5 mg./ml. | 24 | 18.9 |
| Do | Linoleic acid | 0.5 mg./ml. | 24 | 18.6 |
| Do | Abietic acid | 0.5 mg./ml. | 24 | 17.1 |
| Do | (Control) | | | 1.5 |

What is claimed is:

1. In a method for producing L-glutamic acid from hydrocarbon by fermentation of an aqueous nutrient medium containing a carbon source and a micro-organism capable of converting paraffinic hydrocarbon into L-glutamic acid, the improvement according to which the carbon source is constituted by a major proportion of paraffinic hydrocarbon, and a minor proportion of a conversion-enhancing agent whereby the L-glutamic acid is enhanced, said paraffinic hydrocarbon containing from ten to twenty carbon atoms, said conversion-enhancing agent selected from the group consisting of acetic acid, and an acetate.

2. A method according to claim 1, wherein the conversion-enhancing agent includes an antibiotic.

3. A method according to claim 2, wherein the antibiotic comprises penicillin.

4. A method according to claim 1, wherein the conversion-enhancing agent includes a surface-active agent.

5. A method according to claim 1, wherein the conversion-enhancing agent includes a higher fatty acid.

6. In a method for producing L-glutamic acid from hydrocarbon by fermentation of an aqueous nutrient medium containing a carbon source and a microorganism capable of converting paraffinic hydrocarbon into L-glutamic acid, the improvement according to which the carbon source is constituted by a major proportion of a paraffinic hydrocarbon, and a minor proportion of a conversion enhancing agent whereby the L-glutamic acid production is enhanced, said paraffinic hydrocarbon containing from ten to twenty carbon atoms, said conversion-enhancing agent selected from the group consisting of acetic acid and an acetate, and said microorganism is selected from a group of genera consisting of Corynebacterium, Arthrobacter, Brevibacterium, and Micrococcus.

7. A method according to claim 6, wherein the microorganism is selected from the group consisting of *Arthrobacter paraffineus, Arthrobacter hydrocarboglutamicus, Arthrobacter roseoparaffinus, Arthrobacter simplex, Brevibacterium ketoglutamicum, Corynebacterium hydrocarboclastus,* and *Micrococcus paraffinolyticus.*

8. A method according to claim 6, wherein the microorganism is selected from the group consisting of *Arthrobacter simplex* (ATCC No. 15799), *Corynebacterium hydrocarboclastus* (ATCC No. 15592), and *Arthrobacter paraffineus* (ATCC No. 15591).

9. A method according to claim 1, wherein the conversion-enhancing agent is in the fermentation medium at the beginning of the fermentation.

10. A method according to claim 1, wherein the conversion-enhancing agent is added to the fermentation medium while the fermentation is continuing.

11. A method according to claim 6 wherein the conversion-enhancing agent includes an antibiotic.

12. A method according to claim 6 wherein the conversion-enhancing agent includes a surface-active agent.

13. A method according to claim 6 wherein the conversion-enhancing agent includes a fatty acid.

14. A method according to claim 7 wherein the conversion-enhancing agent includes an antibiotic.

15. A method according to claim 7 wherein the conversion-enhancing agent includes a surface-active agent.

16. A method according to claim 7 wherein the conversion-enhancing agent includes a fatty acid.

References Cited

UNITED STATES PATENTS

| | | | |
|---|---|---|---|
| 3,080,297 | 3/1963 | Phillips et al. | 195—47 |
| 3,222,258 | 12/1965 | Iizuka et al. | 195—29 |
| 3,227,625 | 1/1966 | Phillips | 195—30 |
| 3,326,775 | 6/1967 | Miescher | 195—47 |
| 3,313,709 | 4/1967 | Phillips | 195—28 |

OTHER REFERENCES

Iguchi et al.: Agr. Biol. Chem. (Japan), vol. 29, No. 6, pp. 589–90, 1965.

Chemical Abstracts 64, 11589f (1966).
Chemical Abstracts 66, 54265w (1967).
Chemical Abstracts 66, 64388c (1967).

LIONEL M. SHAPIRO, Primary Examiner

U.S. Cl. X.R.

195—114